United States Patent
Lou et al.

(10) Patent No.: US 12,498,397 B2
(45) Date of Patent: Dec. 16, 2025

(54) PROBE CARD AND THERMAL CONDUCTION DEVICE THEREOF

(71) Applicant: STAR TECHNOLOGIES, INC., Hsinchu (TW)

(72) Inventors: Choon Leong Lou, Hsinchu (TW); Ho-Yeh Chen, Hsinchu (TW)

(73) Assignee: STAR TECHNOLOGIES, INC., Hsinchu (TW)

( * ) Notice: Subject to any disclaimer, the term of this patent is extended or adjusted under 35 U.S.C. 154(b) by 135 days.

(21) Appl. No.: 18/394,378

(22) Filed: Dec. 22, 2023

(65) Prior Publication Data

US 2025/0110153 A1 Apr. 3, 2025

(30) Foreign Application Priority Data

Oct. 3, 2023 (TW) ................. 112137966

(51) Int. Cl.
*G01R 1/073* (2006.01)
*G01R 1/067* (2006.01)

(52) U.S. Cl.
CPC ..... *G01R 1/06783* (2013.01); *G01R 1/07342* (2013.01)

(58) Field of Classification Search
CPC ............ G01R 31/2874; G01R 31/2877; G01R 1/07307; G01R 31/2875; G01R 1/07378; G01R 1/0458; G01R 31/2884
USPC ............. 324/750.03, 754.11, 750.09, 750.28
See application file for complete search history.

(56) References Cited

U.S. PATENT DOCUMENTS

| 2003/0146770 A1* | 8/2003 | Ivanov ............... | G01R 1/07378 324/750.09 |
| 2009/0260459 A1* | 10/2009 | Kim ................... | G01R 1/07307 73/866.5 |
| 2011/0074080 A1 | 3/2011 | Di Stefano et al. | |
| 2011/0121851 A1* | 5/2011 | Lee .................... | G01R 1/07378 324/756.03 |
| 2012/0168964 A1* | 7/2012 | Kim ................... | G01R 1/07307 257/E21.531 |

(Continued)

FOREIGN PATENT DOCUMENTS

| CN | 104198772 A | 12/2014 |
| JP | 2013-88257 A | 5/2013 |
| JP | 2013-117476 A | 6/2013 |

(Continued)

OTHER PUBLICATIONS

An Office Action for JP Application No. 2024-033760 dated May 20, 2025 and its English translation is attached (5 pages).

*Primary Examiner* — Roberto Velez
(74) *Attorney, Agent, or Firm* — MUNCY, GEISSLER, OLDS & LOWE, P.C.

(57) ABSTRACT

The present disclosure provides a probe card and a thermal conduction device thereof. The thermal conduction device includes a plurality of first walls and a plurality of second walls. The first walls and the second walls are crossly arranged to form a plurality of accommodation spaces. The probe assemblies are disposed in the accommodation spaces. Each probe assembly includes a plurality of probes and a case which is configured to accommodate the probes. First ends of the probes face toward an opening of the corresponding accommodation space. Second ends of the probes face toward another opening of the corresponding accommodation space.

14 Claims, 9 Drawing Sheets

(56) References Cited

U.S. PATENT DOCUMENTS

2014/0266281 A1 9/2014 Wang et al.
2017/0363680 A1* 12/2017 Saito .................. G01R 31/2875

FOREIGN PATENT DOCUMENTS

| | | | |
|---|---|---|---|
| JP | 2022191144 | A | 12/2022 |
| TW | I470245 | B | 1/2015 |
| TW | I722707 | B | 3/2021 |
| TW | 202146907 | A | 12/2021 |
| TW | 202218269 | A | 5/2022 |
| TW | M632374 | U | 9/2022 |
| TW | I779676 | B | 10/2022 |
| WO | WO2013/051675 | A1 | 4/2013 |

* cited by examiner

PROBE CARD AND THERMAL CONDUCTION DEVICE THEREOF

CROSS REFERENCE TO RELATED APPLICATION

This application claims priority of Taiwan patent application No. 112137966 filed on Oct. 3, 2023, which is incorporated by reference in its entirety.

TECHNICAL FIELD

The present disclosure relates to probe cards and, more particularly, to a probe card with a thermal conduction device.

DISCUSSION OF THE BACKGROUND

According to prior art, semiconductor devices under test (DUT) or chips undergo electrical tests with a probe card and a tester. The ambient is temperature at which the tests are performed depends on the types of the DUTs or chips.

However, the tests usually require high electric power (for example, at least 1000 Watt) and thus generate plenty of heat which may be transferred to the DUT or chip via the probe card to affect the tests significantly or even damage the DUT or chip, deteriorating test precision to a great extent. Furthermore, the higher the ambient temperature is set, the more difficult the generated heat can be precisely controlled, deteriorating test precision as well. Moreover, the range of the operating temperature of the tester is usually narrow, say, 20° C. to 30° C., and in consequence the tester yields abnormal test results when operating outside the operating temperature range.

Taking memory testing as an example, using a probe card with a probe array block to test a memory has a drawback: testing accuracy deteriorates after a while of operation as a result of overheat, as the probe array blocks are cooled down mostly by air-cooling technology not effective in dissipating heat from the probes of each probe array block, because the probe card does not have any additional channel.

Therefore, the temperature control over a probe card in direct engagement with a tester and in direct contact with a DUT or chip is of vital importance, and it is imperative to control the temperature of the probe card with a view to performing an electrical test steadily.

The above description of the prior art serves as an introduction to background technology but does not imply admitting that the described is prior art discloses any subject matters of the disclosure or constitutes the prior art of the disclosure. Furthermore, the described prior art should not be deemed part of the disclosure.

SUMMARY

It is an objective of the disclosure to provide a probe card and a thermal conduction device thereof to overcome the aforesaid drawback of the prior art: failure to effectively achieve cooling with a view to controlling probe card temperature steadily.

An embodiment of the disclosure provides a probe card comprising a thermal conduction device and a plurality of probe assemblies. The thermal conduction device comprises a plurality of first walls and a plurality of second walls. The plurality of first walls and the plurality of second walls cross to each other to define a plurality of receiving spaces. The plurality of probe assemblies are disposed in the plurality of receiving spaces. Each probe assembly comprises a plurality of probes and a case. The case receives the plurality of probes and is in contact with the thermal conduction device. First ends of the plurality of probes face openings of the receiving spaces. Second ends of the plurality of probes face other openings of the receiving spaces.

Another embodiment of the disclosure provides a thermal conduction device comprising a plurality of first walls, a plurality of second walls and a plurality of receiving spaces. The plurality of receiving spaces are formed by cross between the plurality of first walls and the plurality of second walls. The plurality of receiving spaces receive a plurality of probe assemblies. A plurality of cases of the plurality of probe assemblies are in contact with the thermal conduction device. Each receiving space has a first opening and a second opening. The first openings expose first ends of a plurality of probes of the probe assemblies. The second openings expose second ends of the probes of the probe assemblies. When the plurality of receiving spaces receive the plurality of probe assemblies, a plurality of heat conduction paths are provided between the thermal conduction device and the cases of the probe assemblies.

To sum up, a probe card of the disclosure has a thermal conduction device, and the temperature of the probe card can be precisely controlled. It is because probe assemblies can be received in receiving spaces to dissipate heat generated from the probe assemblies, enhancing the efficiency of cooling.

The technical features and advantages of the disclosure are described generally and extensively above to render the description of the disclosure below comprehensible. Other technical features and advantages of the subject matters of the claims of the disclosure are described below. Persons skilled in the art understand that concepts and specific embodiments presented below can be easily amended to design any other structures or manufacturing processes and thereby achieve the same objective as the disclosure. Persons skilled in the art also understand that the aforesaid equivalent constructions cannot depart from the spirit and scope defined in the appended claims of the disclosure.

BRIEF DESCRIPTION OF THE DRAWINGS

Persons skilled in the art can gain insight into the disclosure by referring to the embodiments, claims and drawings of the disclosure. In the drawings, like components are denoted by like reference numerals.

DETAILED DESCRIPTION

The description below is accompanied by and incorporated into some of the drawings to illustrate the embodiments of the disclosure. However, is the disclosure is not limited to the embodiments. The embodiments described below may be appropriately integrated to attain any other embodiments.

The purpose of the expressions "an embodiment," "embodiment," "exemplary embodiment," "other embodiments" and "another embodiment" used herein is to state that the embodiments of the disclosure can include specific features, structures or characteristics. However, not every embodiment must include the specific features, structures or characteristics. Furthermore, repeated use of the expression "in an embodiment" does not necessarily imply referring to the same embodiment, as the possibility of referring to the same embodiment should not be ruled out.

The description below goes into detail about steps and structures in order for the disclosure to be fully comprehensible. Obviously, the embodiments of the disclosure do not place any limitations on specific details well known among persons skilled in the art. In addition, well-known structures and steps are not reiterated herein such that no limitations are unnecessarily placed on the disclosure. Preferred embodiments of the disclosure are described in detail below. However, in addition to the detailed description, the disclosure can be extensively implemented in other embodiments. Rather than restricted to the detailed description, the scope of the disclosure is defined by the appended claims.

It is noteworthy that the detailed description below is accompanied by different embodiments or examples for use in implementing various features of the disclosure. Specific embodiments or examples about is components and arrangement thereof are presented below to simplify the description of the disclosure; however, the specific embodiments or examples are illustrative rather than restrictive. For example, the dimensions of the disclosed components are not restricted to any disclosed ranges or values but depend on requirements of a related manufacturing process and/or expected characteristics of a related device. In addition, concepts, such as "forming a first feature above or on a second feature," as disclosed in the description below may apply to embodiments, such as "forming a first feature and a second feature in such a way that the first and second features are in direct contact with each other," and "forming a first feature and a second feature in such a way that an additional feature is formed between the first and second features to ensure that the contact between the first and second features is indirect." For the sake of conciseness and clarity, the accompanying drawings can be drawn in different scales in order to depict various features, not to mention leaving out some layers/features.

In addition, for explanatory purposes, expressions about spatial relationships, such as "beneath," "below," "lower," "above" and "upper," are used herein to explain the relationship between one component (or feature) and another component (or feature), as shown in the accompanying drawings. The expressions about spatial relationships are intended to indicate any other directions in which the components are used or operated in addition to the directions depicted in the accompanying drawings. The components may have any other directions (be rotated by 90 degrees or be aligned with another direction), and the expressions about spatial relationships can be construed accordingly.

In some embodiments of the disclosure, a probe card comprises a thermal conduction device and a plurality of probe assemblies. The thermal conduction device comprises a plurality of first walls and a plurality of second walls. The plurality of first walls and the plurality of second walls cross to each other to define a plurality of receiving spaces. Each receiving space has a through-hole shape so as to receive a probe assembly. When the probe assemblies are disposed in the receiving spaces, cases of the probe assemblies are in contact with the thermal conduction device; thus, ends of a plurality of probes of the probe assemblies are exposed from openings on some sides of the receiving spaces and directly or indirectly electrically connected to a tester, but other ends of the plurality of probes of the probe assemblies are exposed from openings on other sides of the receiving spaces and are in contact with a device under test (DUT). The cases of the probe assemblies are in direct contact with the thermal conduction device on the inner sides of the receiving spaces, and thus the thermal conduction device dissipates the heat generated from the probe assemblies in operation, enhancing the precision of the control of the temperature of the probe card. Related structural features are illustrated by embodiments and described below.

Figure 1:
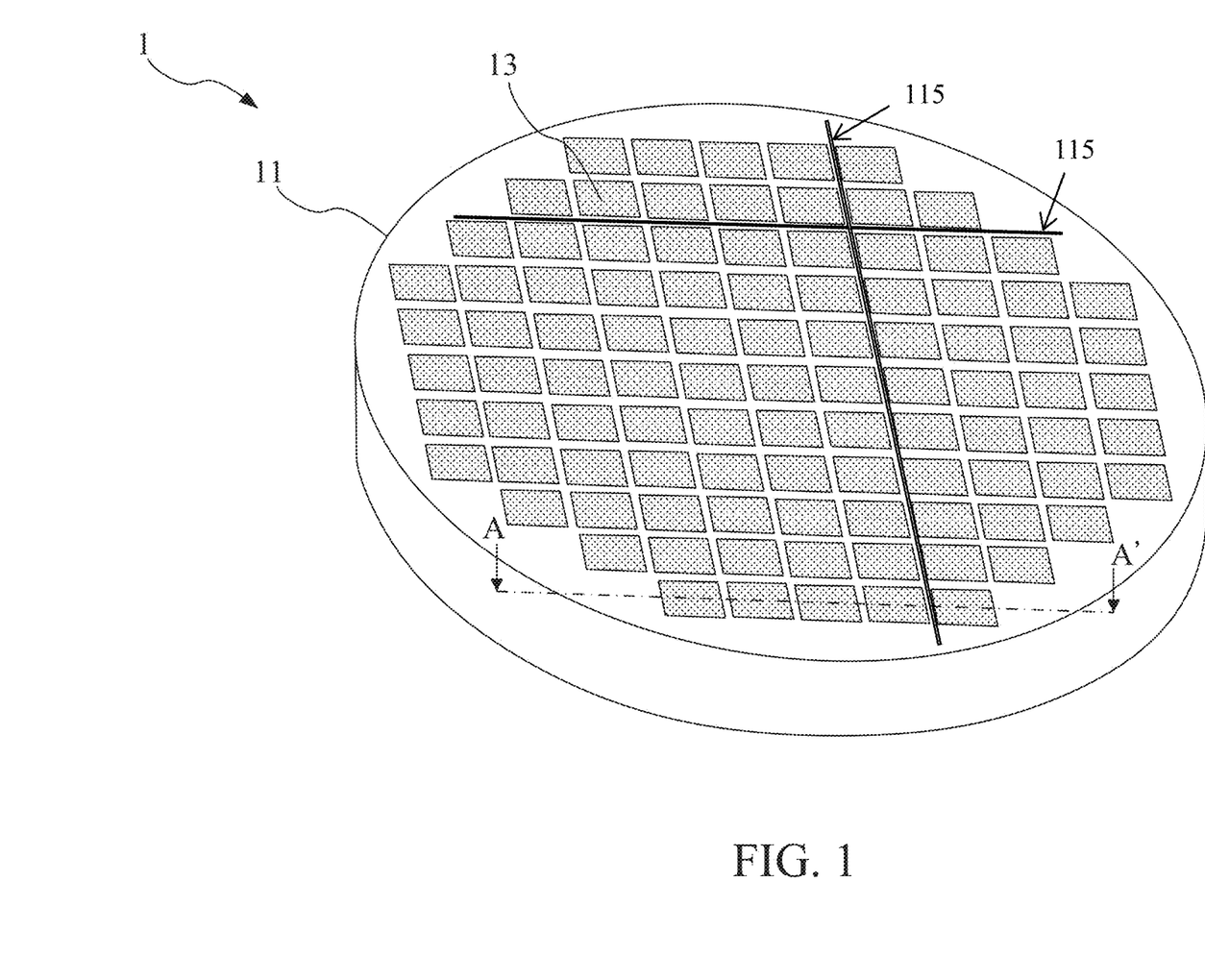
FIG. 1 is a perspective view of a probe card according to some embodiments of the disclosure.
Figure 2:
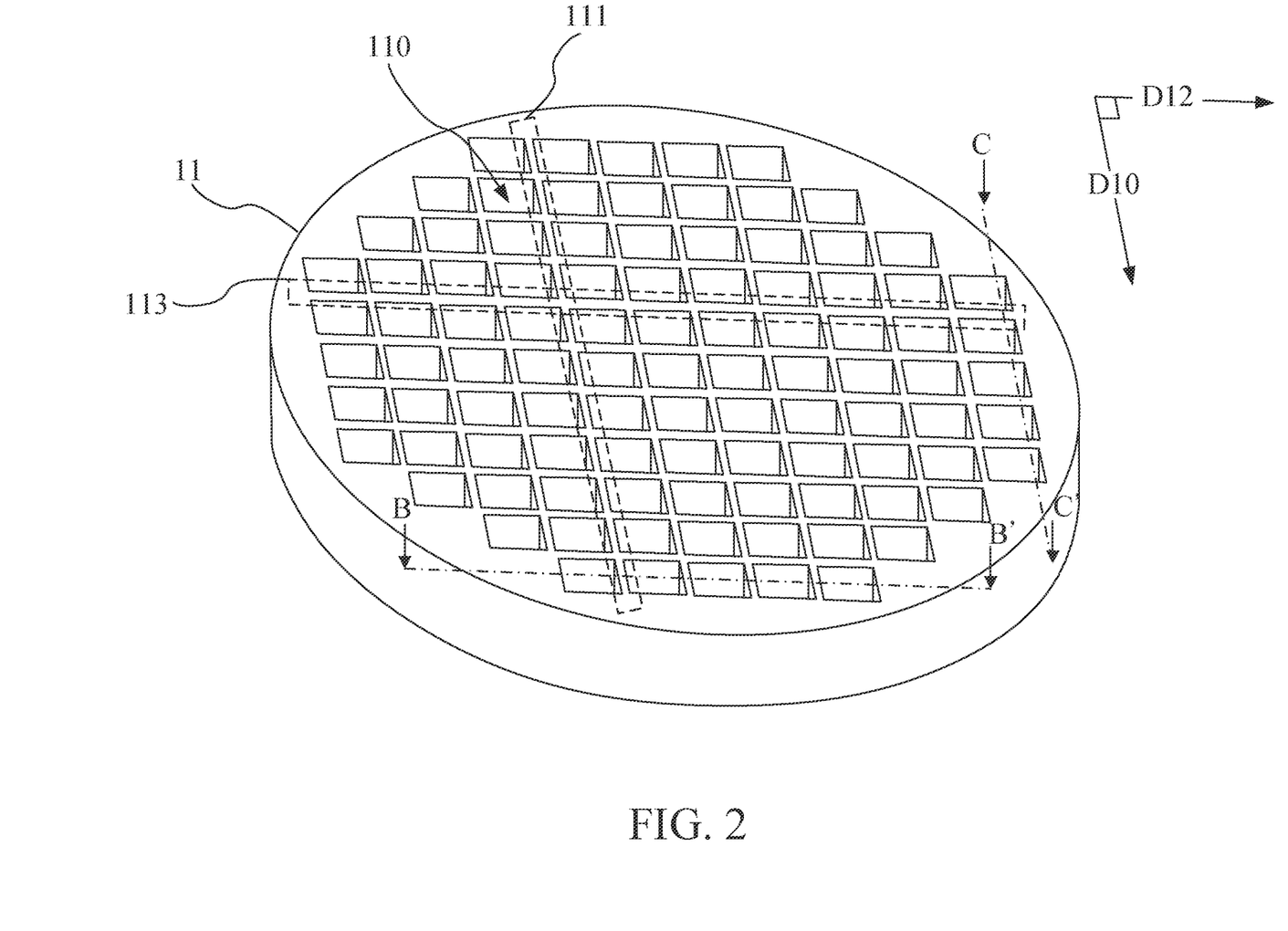
FIG. 2 is a perspective view of a thermal conduction device according to some embodiments of the disclosure.
Figure 3:
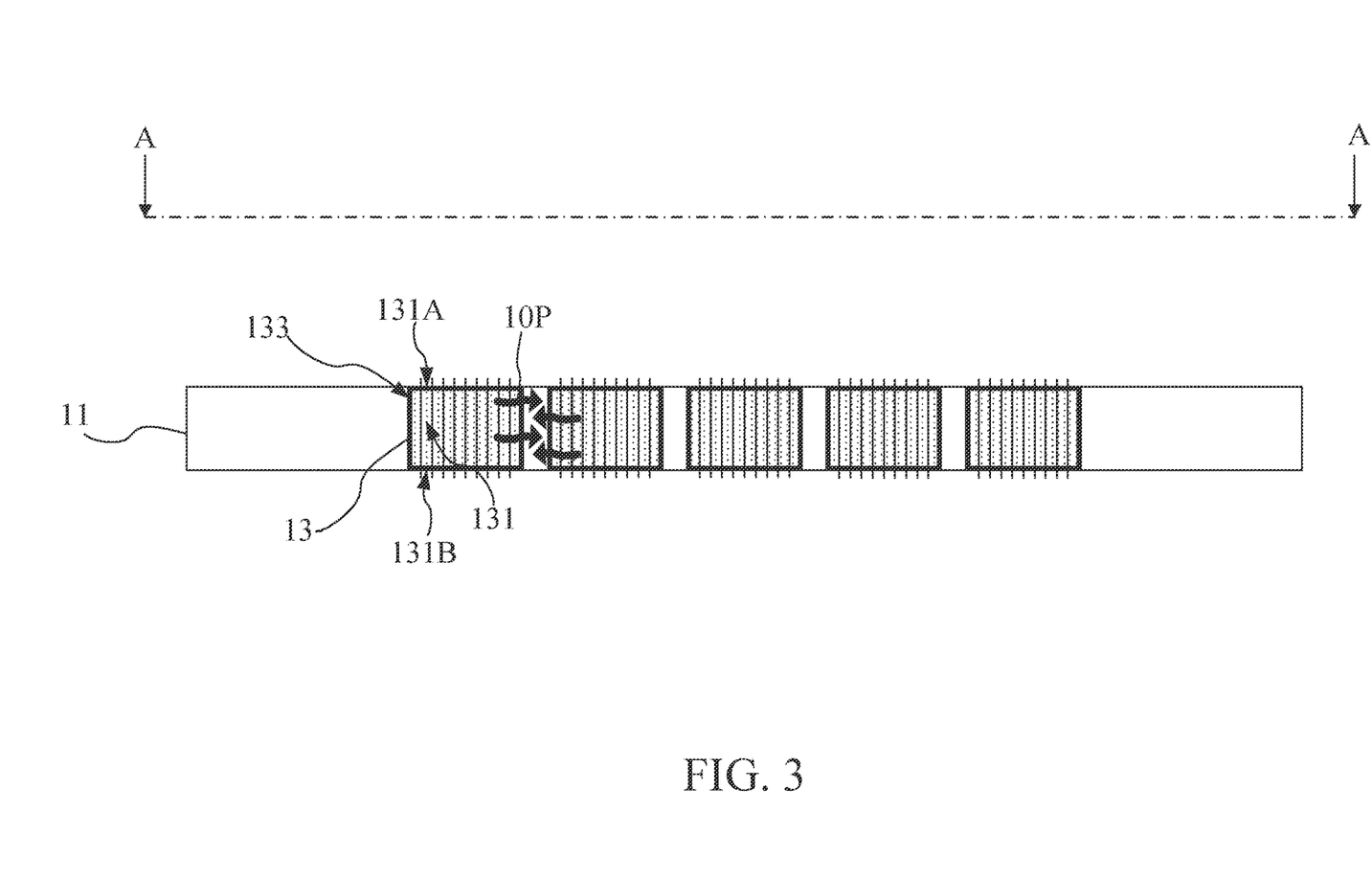
FIG. 3 is a cross-sectional view of the probe card according to some embodiments of the disclosure.
Figure 4:
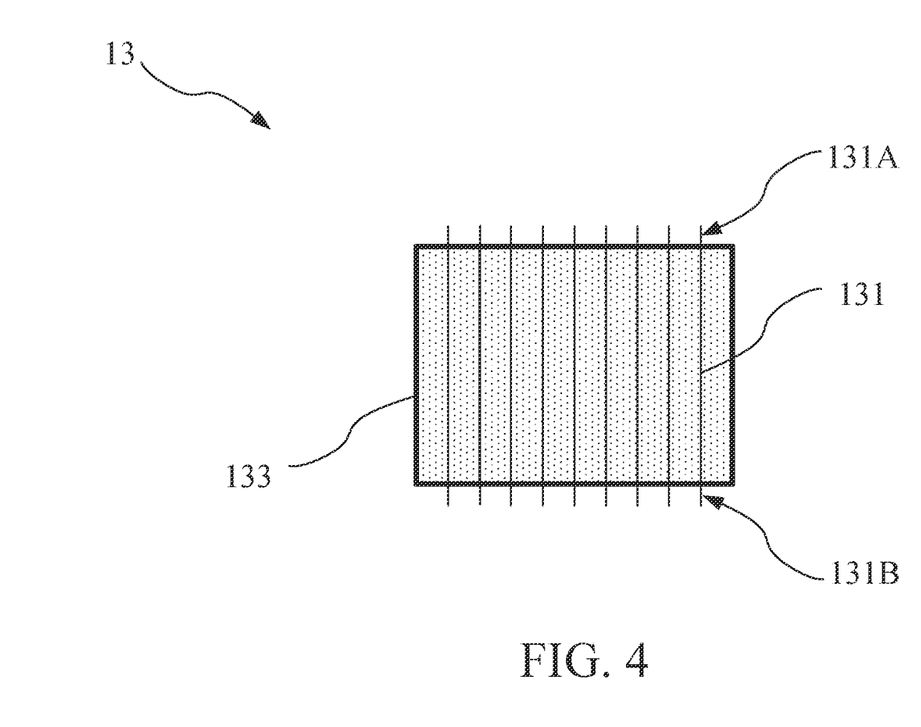
FIG. 4 is a schematic view of a probe assembly according to some embodiments of the disclosure.
Figure 5:
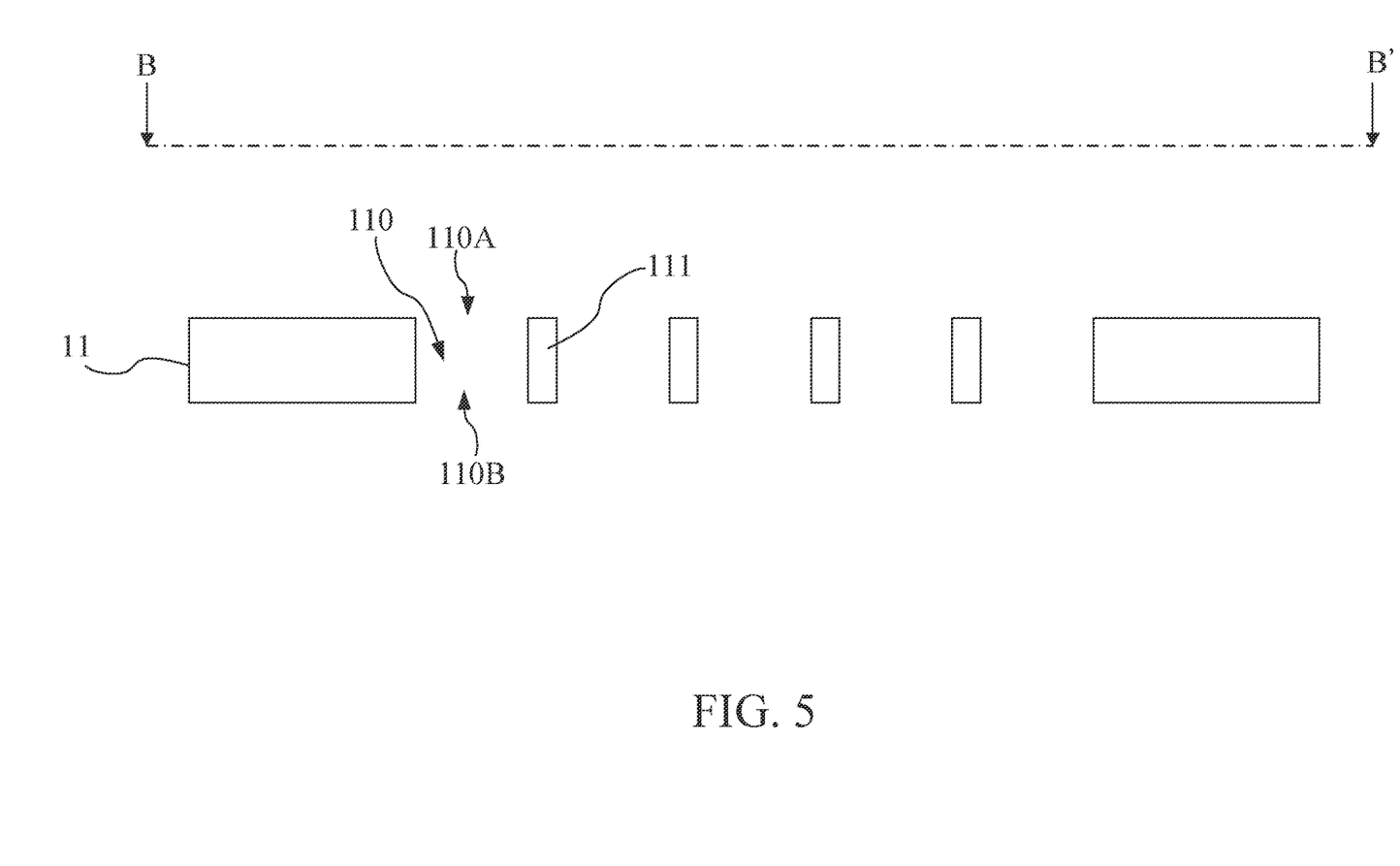
FIG. 5 is a cross-sectional view of the thermal conduction device according to some embodiments of the disclosure.
Figure 6:
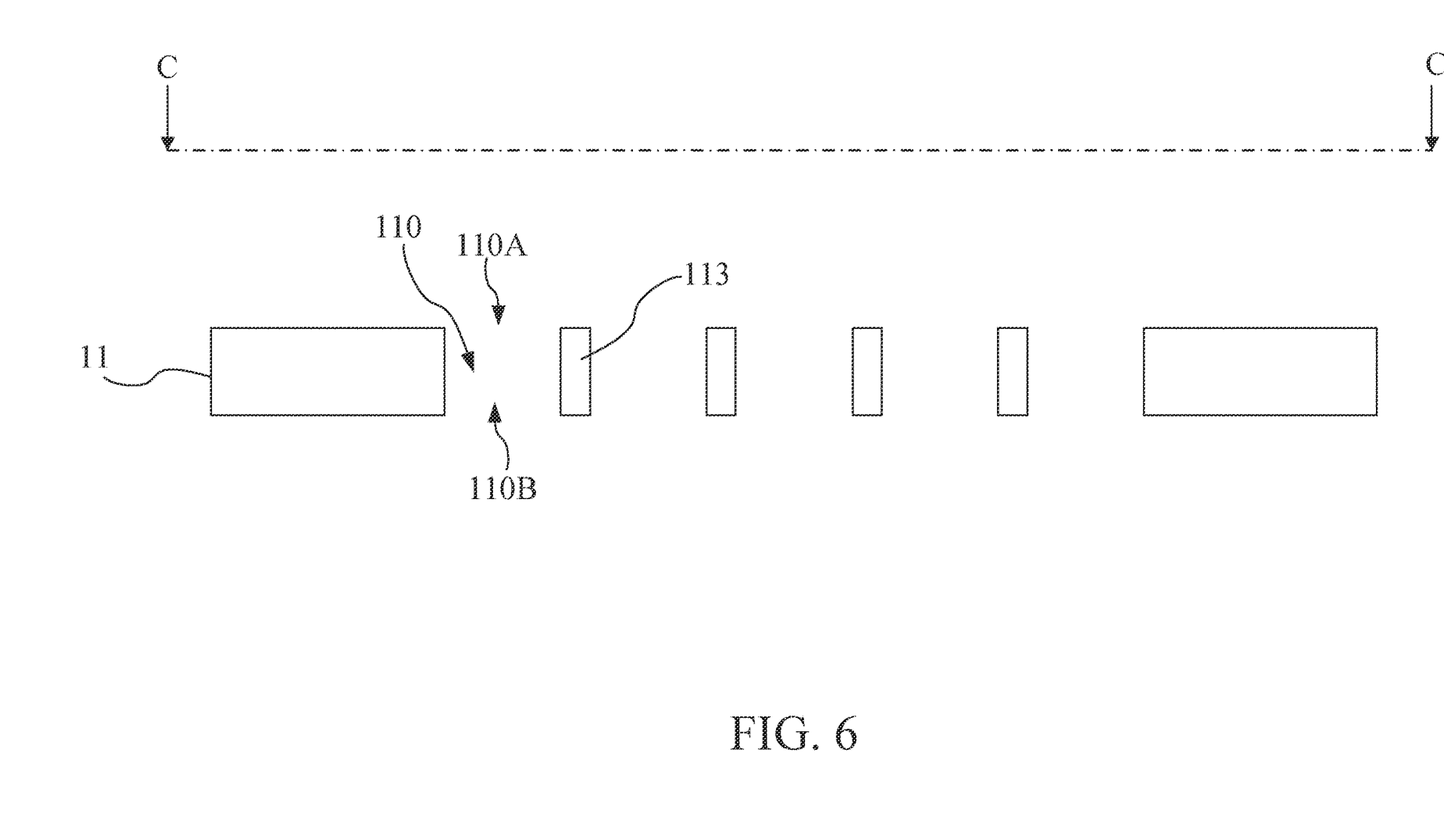
FIG. 6 is a cross-sectional view of the thermal conduction device according to some embodiments of the disclosure.

Referring to FIG. 1, there is shown a perspective view of a probe card 1 according to some embodiments of the disclosure. Referring to FIG. 2, there is shown a perspective view of a thermal conduction device 11 according to some embodiments of the disclosure. Referring to FIG. 3, there is shown a cross-sectional view of the probe card 1 according to some embodiments of the disclosure. Referring to FIG. 4, there is shown a schematic view of a probe assembly 13 according to some embodiments of is the disclosure. Referring to FIGS. 5 and 6, there are shown cross-sectional views of the thermal conduction device 11 according to some embodiments of the disclosure. Specifically speaking, the probe card 1 comprises the thermal conduction device 11 and the plurality of probe assemblies 13. The thermal conduction device 11 has a plurality of receiving spaces 110 for receiving the plurality of probe assemblies 13.

In some embodiments, the thermal conduction device 11 comprises a plurality of first walls 111 and a plurality of second walls 113 which together define the receiving spaces 110. The plurality of first walls 111 are parallel. The plurality of second walls 113 are parallel. The plurality of first walls 111 and the plurality of second walls 113 cross to each other to define the plurality of receiving spaces 110. In other words, the plurality of first walls 111 each cross the plurality of second walls 113, and vice versa, to define the plurality of receiving spaces 110.

Referring to FIG. 2, a direction D10 and a direction D12 are perpendicular to each other. The first walls 111 extend along the direction D10 and are lined up in a row along the direction D12. The second walls 113 extend along the direction D12 and are lined up in a row along the direction D10. Thus, the first walls 111 are each perpendicular to the second walls 113, and vice versa, such that the first walls 111 and the second walls 113 cross to each other to define the plurality of receiving spaces 110 (i.e., the first walls 111 each cross the second walls 113, and vice versa, to define the plurality of receiving spaces 110.

In some embodiments, the first walls 111 and the second walls 113 are stiffeners and thus are capable of providing mechanical support. In some embodiments, the plurality of first walls 111 and the plurality of is second walls 113 are integrally formed (for example, cast simultaneously with the same die). In some embodiments, the cells of the first walls 111 and the second walls 113 fall within the ranges demarcated by dashed lines or a portion of the ranges demarcated by dashed lines in FIG. 2.

In some embodiments, the receiving spaces 110 defined by the first walls 111 and the second walls 113 are through holes each having a first opening 110A and a second opening 110B. Each receiving space 110 receives one probe assembly 13; in other words, the probe assemblies 13 are disposed in the receiving spaces 110, respectively, in a one-to-one relationship. The probe assemblies 13 each comprise a plurality of probes 131 and a case 133. The case 133 receives the plurality of probes 131. First ends 131A and second ends 131B of the plurality of probes 131 protrude outward from two sides of the case 133, respectively, so as to be electrically connected to an external component.

In some embodiments, when the probe assemblies 13 are disposed in the receiving spaces 110, the first ends 131A of the probes 131 protrude outward from the first openings 110A of the receiving spaces 110 (receiving the probes 131), respectively, and the second ends 131B of the probes 131 protrude outward from the second openings 110B of the receiving spaces 110 (receiving the probes 131), respectively.

In some embodiments, an inner side of each of the receiving spaces 110 forms a continuous inner peripheral surface along the first walls 111 and the second walls 113, and an outer side of the case 133 of each of the probe assemblies 13 forms a continuous outer peripheral surface. When the probe assemblies 13 are received in the receiving spaces 110, the whole (or a portion) of the outer peripheral surface (i.e., outer peripheral sidewall) of the case 133 of the probe assemblies 13 is in direct contact with the whole (or a portion) of the inner peripheral surface (i.e., inner peripheral sidewall) of the receiving spaces 110 to allow the case 133 of the probe assemblies 13 to be in direct contact with the thermal conduction device 11, providing a plurality of heat conduction paths 10P (indicated by bold arrows in FIG. 3) between the thermal conduction device 11 and the probe assemblies 13. Therefore, when the probe assemblies 13 in operation generate plenty of heat, the heat is transferred to the thermal conduction device 11 via the heat conduction paths 10P and then instantly dissipated by the thermal conduction device 11, enhancing the precision of the control of the temperature of the probe card 1.

In some embodiments, the thermal conduction device 11 further comprises at least one heat-dissipating component 115 (shown in FIG. 1) configured to be in contact with at least a portion of the first walls 111 and the second walls 113 to speed up heat dissipation. The heat-dissipating component 115 comprises a water-cooled heat-dissipating component, a fin-contact heat-dissipating component or any combination of the water-cooled heat-dissipating component and the fin-contact heat-dissipating component.

For instance, the heat-dissipating component 115 comprises a fin-contact heat-dissipating component. The fin-contact heat-dissipating component is disposed on the upper plane of the thermal conduction device 11 in order to come into contact with at least a portion of the first walls 111 and second walls 113 from above. Thus, when the fin-contact heat-dissipating component undergoes heat dissipation by air-cooling, the thermal conduction device 11 in contact with the fin-contact heat-dissipating component undergoes heat dissipation as well. For example, the heat-dissipating component 115 comprises the fin-contact heat-dissipating component configured to come into contact with at least a portion of the first walls 111 and the second walls 113, and a cooling fluid of a water-cooled heat-dissipating component removes the heat introduced by the fin-contact heat-dissipating component. For example, the heat-dissipating component 115 comprises a water-cooled heat-dissipating component and cools down at least a portion of the first walls 111 and the second walls 113 directly with a cooling fluid of the water-cooled heat-dissipating component.

Figure 7:
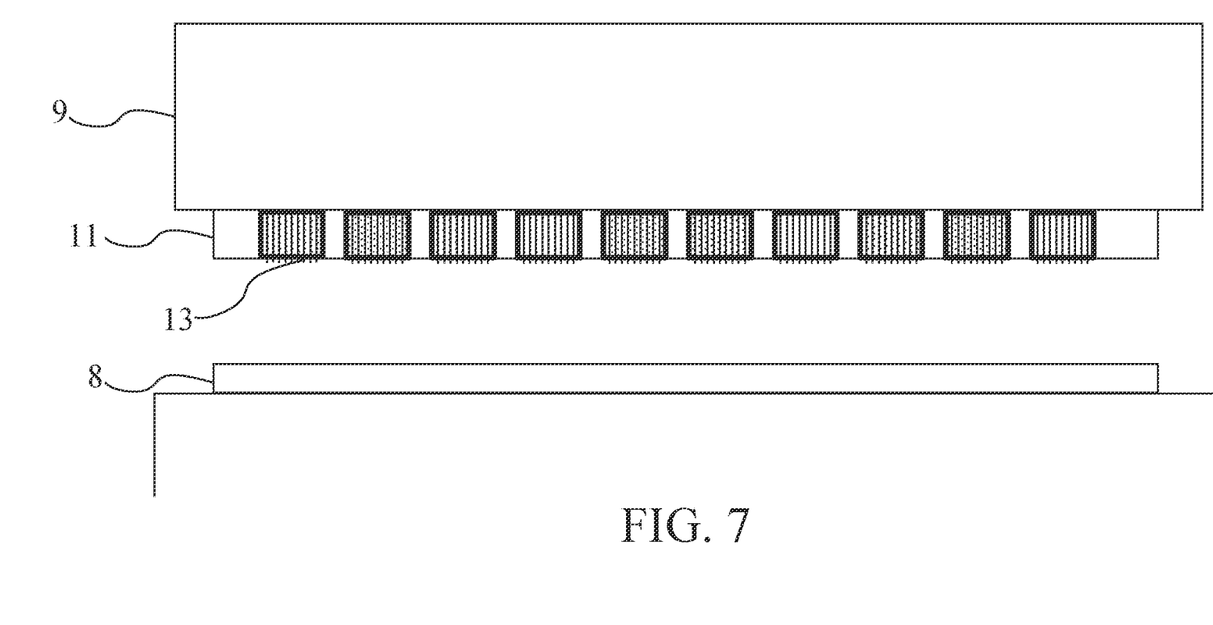
FIG. 7 is a schematic view of how to use the probe card according to some embodiments of the disclosure.

Referring to FIG. 7, there is shown a schematic view of how to use the probe card 1 according to some embodiments of the disclosure. Specifically speaking, when the probe assemblies 13 are received in the receiving spaces 110 of the thermal conduction device 11, the first openings 110A of the receiving spaces 110 expose the first ends 131A of the plurality of probes 131 of the probe assemblies 13, respectively, allowing the plurality of probes 131 to be electrically connected to a tester 9. When the probe assemblies 13 are received in the receiving spaces 110, the second openings 1101B of the receiving spaces 110 expose the second ends 131B of the plurality of probes 131 of the probe assemblies 13, respectively, allowing the plurality of probes 131 to come into contact with electrical contacts of a device under test (DUT) 8. As shown in the diagram, the plurality of probes 131 are directly electrically connected to the tester 9, but the disclosure is not limited thereto. In other embodiments, the plurality of probes 131 are indirectly electrically connected to the tester 9 via an intervening component.

In some embodiments, the probe card 1 generates plenty of heat while is the DUT 8 is undergoing a high-frequency or high-power test with the probe card 1, and the heat is effectively removed by the thermal conduction device 11 to prevent the probe assemblies 13 from undergoing deformation which might otherwise occur as a result of abrupt changes in temperature and might affect the test, so as to enhance the precision of the test.

In some embodiments of the disclosure, the probe assemblies (for example, the probe assemblies 1, 2 and 3) are each a probe array block (PAB). In some embodiments of the disclosure, the thermal conduction device (for example, the thermal conduction device 11, 21 and 31) is made of a rigid material with a high thermal conductivity coefficient (for example, a thermal conductivity coefficient greater than or equal to 80 W/mK), for example, a metal like iron and copper, or a non-metal like diamond and graphene. However, the aforesaid technical features are not intended to place limitations on the embodiments of the disclosure.

In some embodiments, each of the receiving spaces 110 is cuboidal in shape, and accordingly each of the probe assemblies 13 is also cuboidal in shape. However, the aforesaid technical features are not intended to place limitations on the embodiments of the disclosure, as persons skilled in the art can change the shapes of the receiving spaces and the probe assemblies as needed by referring to the aforesaid technical features of the embodiments of the disclosure.

Figure 8:
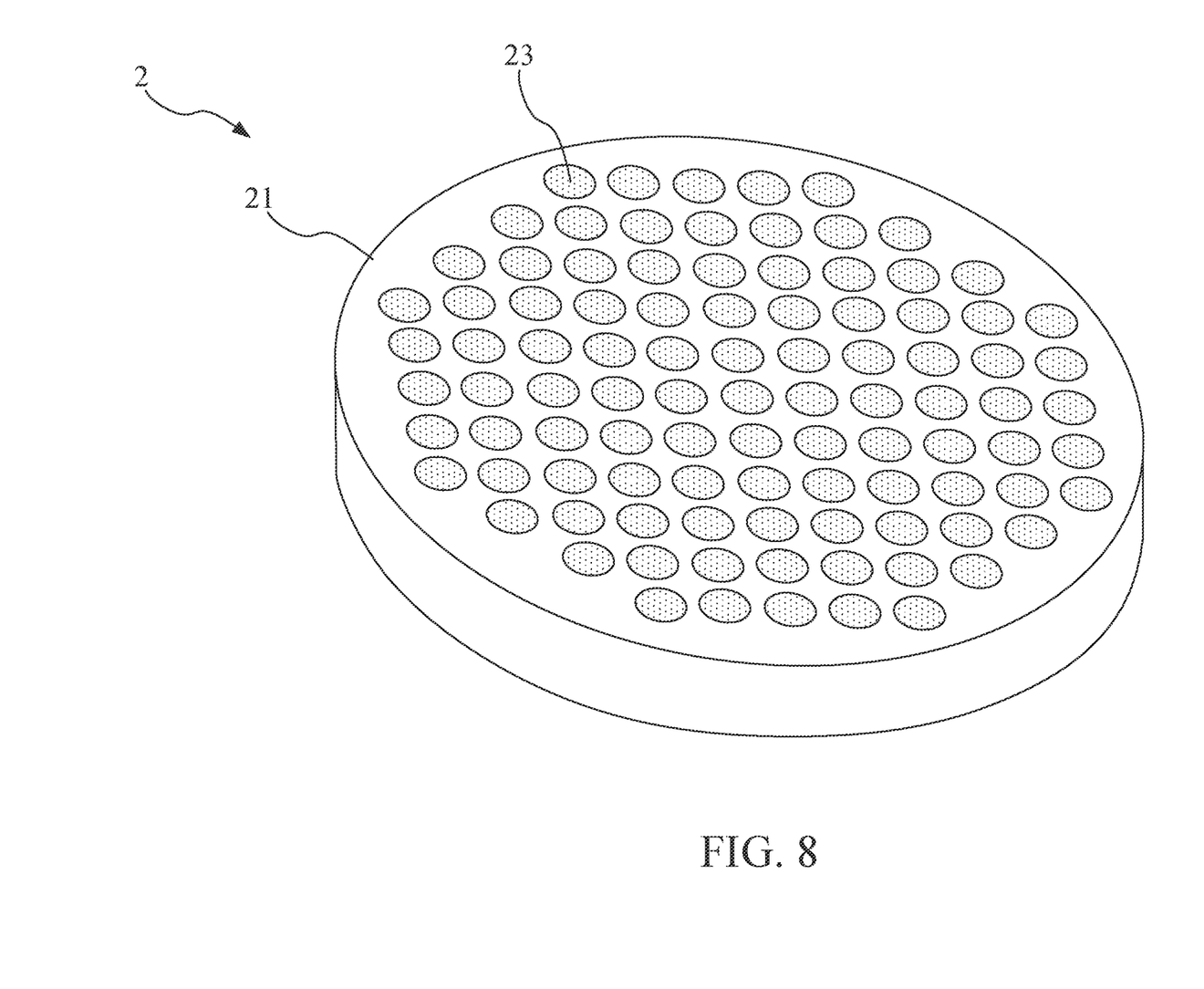
FIG. 8 is a perspective view of a probe card according to some embodiments of the disclosure.
Figure 9:
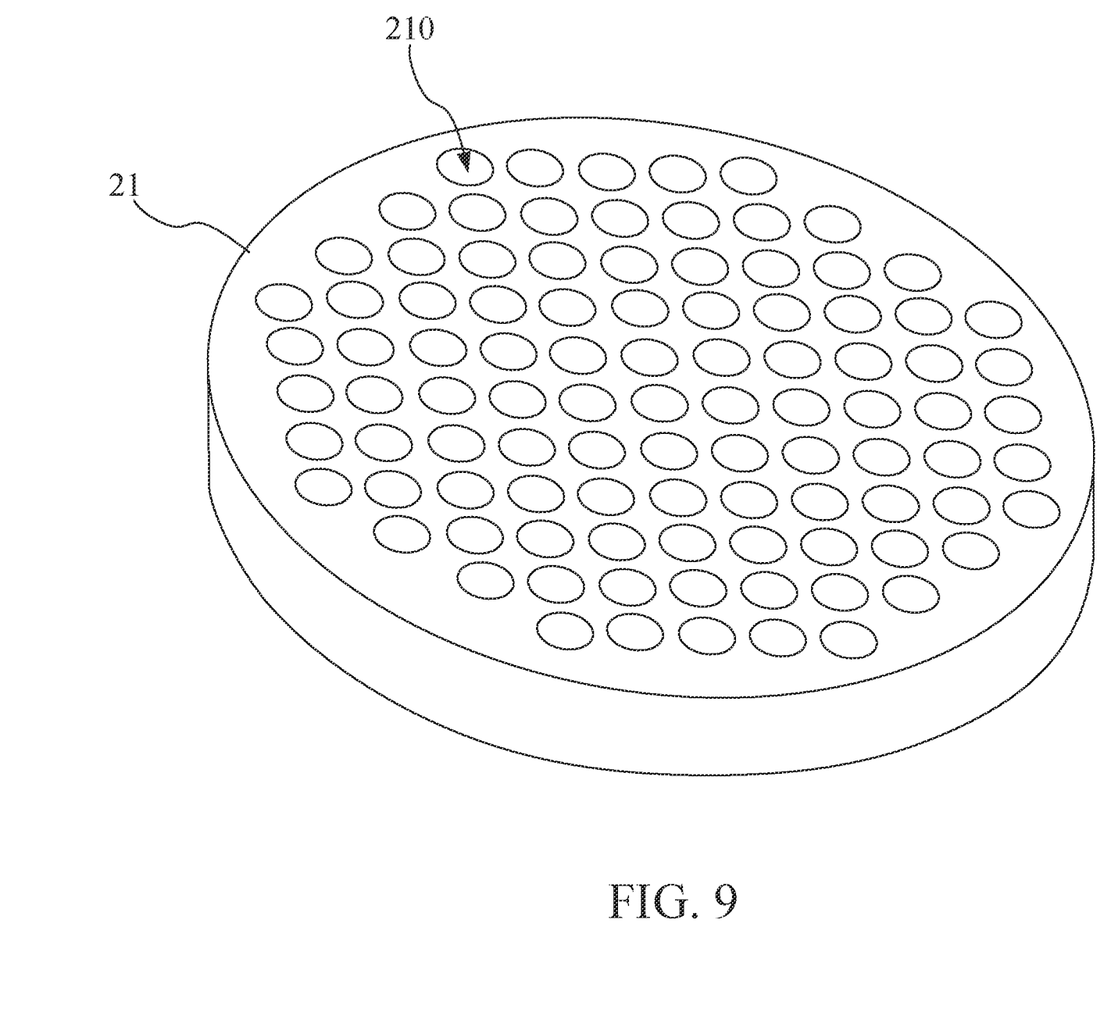
FIG. 9 is a perspective view of a thermal conduction device according to some embodiments of the disclosure.

Referring to FIG. 8, there is shown a perspective view of a probe card 2 according to some embodiments of the disclosure. Referring to FIG. 9, there is shown a perspective view of a thermal conduction device 21 according to some embodiments of the disclosure. Specifically speaking, the probe card 2 comprises the thermal conduction device 21 and a plurality is of probe assemblies 23. The thermal conduction device 21 comprises a plurality of receiving spaces 210 for receiving the plurality of probe assemblies 23. Each of the receiving spaces 210 is cylindrical in shape, and accordingly each of the probe assemblies 23 is also cylindrical in shape.

For the sake of conciseness and clarity, only one single receiving space 110, 210, first wall 111, second wall 113 and probe assembly 13, 23 are shown in the figures that illustrate the embodiments but are not intended to limit the embodiments of the disclosure, and thus persons skilled in the art can gain insight into the receiving spaces, walls and probe assemblies shown in the accompanying drawings.

In conclusion, a probe card and a thermal conduction device in the embodiments of the disclosure advantageously achieve thermal conduction through direct contact between the thermal conduction device and probe assemblies on inner sides of the receiving spaces, enhancing the efficiency and precision of the control of the temperature of the probe card. For instance, in some usage environments, the interior of the probe assemblies is in a vacuum state when the probe card is engaged with a tester, precluding the effective cooling of probes through the introduction of a cooling gas. Therefore, the aforesaid drawback of the prior art is overcome by the disclosure, as the disclosure teaches enhancing the efficiency of thermal conduction through direct contact between the walls of the thermal conduction device, case and probes.

Although the disclosure and advantages thereof are described above in detail, it should be understood that various changes, replacements and substitutions can be made to the embodiments of the disclosure without departing from the spirit and scope defined by the appended claims of the disclosure. For example, the aforesaid manufacturing processes can be implemented with different methods and replaced with other manufacturing processes or combinations thereof.

The scope of the disclosure is not restricted to specific embodiments of any processes, machines, manufacturing, matter compositions, means, methods and steps described herein. The disclosure described herein enables persons skilled in the art to implement the disclosure with any existing or potential processes, machines, manufacturing, matter compositions, means, methods or steps having the same function or capable of achieving substantially the same result as disclosed in the aforesaid embodiments. Therefore, these processes, machines, manufacturing, matter compositions, means, methods and steps fall within the scope of the appended claims of the disclosure.

What is claimed is:

1. A probe card, comprising:
    a thermal conduction device comprising:
        a plurality of first walls; and
        a plurality of second walls, wherein the first walls and the second walls cross to each other to define a plurality of receiving spaces;
        at least one heat-dissipating component in contact with at least a portion of the first walls and the second walls; and
    a plurality of probe assemblies disposed in the receiving spaces and each comprising:
        a plurality of probes; and
        a case for receiving the probes,
    wherein the cases are in contact with the thermal conduction device,
    wherein first ends of the probes face openings of the receiving spaces, and second ends of the probes face other openings of the receiving spaces.

2. The probe card of claim 1, wherein each of the probe assemblies is disposed in a corresponding one of the receiving spaces.

3. The probe card of claim 1, wherein an inner side of each of the receiving spaces forms a continuous inner peripheral surface along the first walls and the second walls, and an outer side of the case of each of the probe assemblies forms a continuous outer peripheral surface, allowing the inner peripheral surface and the outer peripheral surface to be in contact with each other.

4. The probe card of claim 1, wherein a direction of extension of the first walls is perpendicular to a direction of extension of the second walls.

5. The probe card of claim 1, wherein the first walls and the second walls are stiffeners.

6. The probe card of claim 1, wherein the first walls and the second walls are integrally formed.

7. The probe card of claim 1, wherein the at least one heat-dissipating component comprises a water-cooled heat-dissipating component, a fin-contact heat-dissipating component or a combination of the water-cooled heat-dissipating component and the fin-contact heat-dissipating component.

8. The probe card of claim 1, wherein each of the receiving spaces is cuboidal in shape or cylindrical in shape.

9. The probe card of claim 1, wherein the first ends or the second ends of the probes are in electrical contact with a device under test (DUT).

10. A thermal conduction device, comprising:
    a plurality of first walls;
    a plurality of second walls;
    a plurality of receiving spaces formed by cross between the first walls and the second walls, the plurality of receiving spaces receiving a plurality of probe assemblies, wherein a plurality of cases of the probe assemblies are in contact with the thermal conduction device; and,
    at least one heat-dissipating component in contact with at least a portion of the first walls and the second walls,
    wherein each of the receiving spaces has a first opening and a second opening, the first openings expose first ends of a plurality of probes of the probe assemblies, and the second openings expose second ends of the probes of the probe assemblies,
    wherein a plurality of heat conduction paths are provided between the thermal conduction device and the cases of the probe assemblies when the receiving spaces receive the probe assemblies.

11. The thermal conduction device of claim 10, wherein the at least one heat-dissipating component comprises a water-cooled heat-dissipating component, a fin-contact heat-dissipating component or a combination of the water-cooled heat-dissipating component and the fin-contact heat-dissipating component.

12. The thermal conduction device of claim 10, wherein each of the receiving spaces is cuboidal in shape or cylindrical in shape.

13. The thermal conduction device of claim 10, wherein the heat conduction paths transfer heat from the probe assemblies to the thermal conduction device.

14. The thermal conduction device of claim 10, wherein the thermal conduction device is made of a material with a thermal conductivity coefficient greater than or equal to 80 W/mK.

* * * * *